(12) United States Patent
Stanfill

(10) Patent No.: US 10,394,605 B2
(45) Date of Patent: Aug. 27, 2019

(54) MUTABLE CHRONOLOGIES FOR ACCOMMODATION OF RANDOMLY OCCURRING EVENT DELAYS

(71) Applicant: Ab Initio Technology LLC, Lexington, MA (US)

(72) Inventor: Craig W. Stanfill, Lincoln, MA (US)

(73) Assignee: Ab Initio Technology LLC, Lexington, MA (US)

( * ) Notice: Subject to any disclaimer, the term of this patent is extended or adjusted under 35 U.S.C. 154(b) by 204 days.

(21) Appl. No.: 14/808,243

(22) Filed: Jul. 24, 2015

(65) Prior Publication Data

US 2016/0026502 A1 Jan. 28, 2016

Related U.S. Application Data

(60) Provisional application No. 62/028,999, filed on Jul. 25, 2014.

(51) Int. Cl.
*G06F 9/50* (2006.01)
*G06F 9/54* (2006.01)

(52) U.S. Cl.
CPC ............ *G06F 9/5038* (2013.01); *G06F 9/542* (2013.01); *G06F 2209/546* (2013.01)

(58) Field of Classification Search
CPC ... G06F 9/5038; G06F 9/542; G06F 2209/546
USPC ....................................................... 719/318
See application file for complete search history.

(56) References Cited

U.S. PATENT DOCUMENTS

| 9,317,343 B1* | 4/2016 | Willhoit | G06F 16/2228 |
| 10,148,488 B1* | 12/2018 | Willhoit | G06F 16/2228 |
| 2014/0223111 A1* | 8/2014 | Dinkjian | G06F 12/00 711/147 |
| 2017/0116050 A1* | 4/2017 | Thukkaram | G06F 9/542 |

OTHER PUBLICATIONS

Bessiere, Christian, "Constraint Propagation," retrieved from the internet: http://www.lirmm.fr/~bessiere/stock/TR06020.pdf [retrieved Oct. 5, 2015]; pp. 1-63.
Schulte, Christian, "Programming Deep Concurrent Constraint Combinators," in: *Correct System Design*, pp. 1-14, Jan. 1999.

(Continued)

*Primary Examiner* — S. Sough
*Assistant Examiner* — Kimberly L Jordan
(74) *Attorney, Agent, or Firm* — Occhiuti & Rohlicek LLP

(57) ABSTRACT

Causing a computing system to process events from a sequence of events that defines a correct order for said events independent from an order in which those events are received includes: defining a first variable, defining, for the first variable, a chronology of operations on the first variable associated with received events, receiving a first event that pertains to the first variable, executing a first operation on said first variable that results in a first update of the chronology, receiving a delayed event that pertains to the first variable, executing a second operation on said first variable that results in a second update of the chronology, and determining whether the first update is valid or invalid, wherein the delayed event precedes the first event in the sequence, the first update is based on the first event, and the second update is based on the delayed event.

43 Claims, 12 Drawing Sheets

(56) References Cited

OTHER PUBLICATIONS

Schulte, Christian, "Programming Constrain Interference Engines," retrieved from the internet: http://ww.ps.uni-sb.de/Publications/documents/Engines_97.pdf [retrieved Nov. 2, 2009]; pp. 1-15.
"Workshop at the 16$^{th}$ International Conference on Principles and Practice of Constraint Programming," 3$^{rd}$ Workshop on 2010 TRICS Proceedings Techniques for Implementing Constraint Programming Systems, Sep. 6, 2010, pp. 1-83, retrieved from the internet: http://www.csse.monash.edu.au/~guidot/2010TRICS/trics2010.pdf [retrieved Feb. 24, 2016].
Rolf et al., "Load-Balancing Methods for Parallel and Distributed Constraint Solving," 2008 IEEE International Conference on Cluster Computing, Sep. 29, 2008, pp. 304-309.
Sadler, Adam and Carmen Gervet, "Enhancing Set Constraint Solvers with Lexicographic Bounds," Journal of Heuristics, vol. 14, No. 1, pp. 23-67, May 2007.
International Search Report and Written Opinion, PCT Application No. PCT/US2015/041951, dated Mar. 15, 2016 (21 pages).
Brito, Andrey, et al. "Speculative out-of-order event processing with software transaction memory." *Proceedings of the second international conference on Distributed event-based systems*. ACM. 2008.
Brito, Andrey. "Speculation in Parallel and Distributed Event Processing Systems." (2010).
Corsello, Michael. "Temporal Concepts." *Public Distribution: Corrsello Research Foundation*, (2009) pp. 1-24.
Lamport, Leslie. "Time, clocks, and the ordering of events in a distributed system," *Communications of the ACM* 21.7 (1978): 558-565.
Li et al., "Aggressive complex event processing with confidence over out-of-order streams." *Journal of Computer Science and Technology*, (2009) pp. 1-13.
Lloyd et al., "Don't settle for eventual: scalable causal consistency for wide-area storage with COPS." *Proceedings of the Twenty-Third ACM Symposium on Operating Systems Principles*. ACM, (2011).
Lloyd et al., "Stronger Semantics for Low-Latency Geo-Replicated Storage." *NSDI*. vol. 13. (2013).
Lloyd et al., "Don't settle for eventual consistency." *Communications of the ACM*, 57(5): 61-68, (2014).
Mo Liu et al., "Sequence Pattern Query Processing over Out-of-Order Event Streams." *2009 IEEE 25th International Conference on Data Engineering*, Shanghai, 2009, pp. 784-795.
Mutschler et al, "Reliable speculative processing of out-of-order event streams in generic publish/subscribe middlewares," *Proceedings of the 7th ACM international conference on Distributed event-based systems*. ACM, 2013.
Qian et al., "Timestream: Reliable stream computation in the cloud." *Proceedings of the 8th ACM European Conference on Computer Systems*. ACM, (2013).
Wei et al., "Supporting a spectrum of out-of-order event processing technologies: from aggressive to conservative methodologies," *Proceedings of the 2009 ACM SIGMOD International Conference on Management of data*. ACM, (2009).

\* cited by examiner

| t | Event | state | access |
|---|---|---|---|
|   | initialize | valid |   |
| 1 | z,x,$10.00 | valid | z,x |
| 2 | x,z,$1.00 | pending |   |
| 3 | x,y,$15.00 | invalid | x,y,OD |

64　66　68　70

50

| t | x |
|---|---|
| 0 | $0.00 |
| 10 | $2.00 |
| 20 | * |
| 30 | $2.50 |
| 40 | *  |
| 50 | $2.75 |

56　58, 60, 62

52

| t | Type | Valid? | Value |
|---|---|---|---|
| 0 | overwrite | TRUE | $0.00 |
| 10 | overwrite | TRUE | $2.00 |
| 20 | read | TRUE |   |
| 30 | update | TRUE | $2.50 |
| 40 | read | FALSE |   |
| 50 | update | FALSE | $2.75 |

| 32F | t | Symbol | Price |
|---|---|---|---|
| | 1 | AAA | 1.01 |
| | 2 | BBB | 0.37 |
| | 3 | BBB | 0.35 |
| | 4 | BBB | 0.39 |
| | 5 | AAA | 1.10 |
| | 6 | AAA | 1.05 |

| 32A | t | Symbol | Price |
|---|---|---|---|
| | 1 | AAA | 1.01 |

| 34A | Symbol | Price |
|---|---|---|
| | AAA | 0.00 |
| | | 1.01 |

| 32B | t | Symbol | Price |
|---|---|---|---|
| | 1 | AAA | 1.01 |
| | 2 | BBB | 0.37 |

| 34B | Symbol | Price |
|---|---|---|
| | AAA | 0.00 |
| | | 1.01 |

| 36B | Symbol | Price |
|---|---|---|
| | BBB | 0.00 |
| | | 0.37 |

| 32C | t | Symbol | Price |
|---|---|---|---|
| | 1 | AAA | 1.01 |
| | 2 | BBB | 0.37 |
| | 3 | BBB | 0.35 |

| 34C | Symbol | Price |
|---|---|---|
| | AAA | 0.00 |
| | | 1.01 |

| 36C | Symbol | Price |
|---|---|---|
| | BBB | 0.00 |
| | | 0.37 |
| | | * |

| 32D | t | Symbol | Price |
|---|---|---|---|
| | 1 | AAA | 1.01 |
| | 2 | BBB | 0.37 |
| | 3 | BBB | 0.35 |
| | 4 | BBB | 0.39 |

| 34D | Symbol | Price |
|---|---|---|
| | AAA | 0.00 |
| | | 1.01 |

| 36D | Symbol | Price |
|---|---|---|
| | BBB | 0.00 |
| | | 0.37 |
| | | * |
| | | 0.39 |

| 32E | t | Symbol | Price |
|---|---|---|---|
| | 1 | AAA | 1.01 |
| | 2 | BBB | 0.37 |
| | 3 | BBB | 0.35 |
| | 4 | BBB | 0.39 |
| | 5 | AAA | 1.10 |

| 34E | Symbol | Price |
|---|---|---|
| | AAA | 0.00 |
| | | 1.01 |
| | | 1.10 |

| 36E | Symbol | Price |
|---|---|---|
| | BBB | 0.00 |
| | | 0.37 |
| | | * |
| | | 0.39 |

| 32F | t | Symbol | Price |
|---|---|---|---|
| | 1 | AAA | 1.01 |
| | 2 | BBB | 0.37 |
| | 3 | BBB | 0.35 |
| | 4 | BBB | 0.39 |
| | 5 | AAA | 1.10 |
| | 6 | AAA | 1.05 |

| 34F | Symbol | Price |
|---|---|---|
| | AAA | 0.00 |
| | | 1.01 |
| | | 1.10 |
| | | * |

| 36F | Symbol | Price |
|---|---|---|
| | BBB | 0.00 |
| | | 0.37 |
| | | * |
| | | 0.39 |

| t | Symbol | Price |
|---|--------|-------|
| 1 | AAA    | 1.01  |

40A

| Symbol | Price |
|--------|-------|
| AAA    | 0.00  |
|        | 1.01  |

38B

| t | Symbol | Price |
|---|--------|-------|
| 1 | AAA    | 1.01  |
| 2 | BBB    | 0.37  |

40B

| Symbol | Price |
|--------|-------|
| AAA    | 0.00  |
|        | 1.01  |

42B

| Symbol | Price |
|--------|-------|
| BBB    | 0.00  |
|        |       |
|        | 0.37  |

38C

| t | Symbol | Price |
|---|--------|-------|
| 1 | AAA    | 1.01  |
| 2 | BBB    | 0.37  |
| 4 | BBB    | 0.39  |

40C

| Symbol | Price |
|--------|-------|
| AAA    | 0.00  |
|        | 1.01  |

42C

| Symbol | Price |
|--------|-------|
| BBB    | 0.00  |
|        |       |
|        | 0.37  |
|        | 0.39  |

38D

| t | Symbol | Price |
|---|--------|-------|
| 1 | AAA    | 1.01  |
| 2 | BBB    | 0.37  |
| 3 | BBB    | 0.35  |
| 4 | BBB    | 0.39  |

40D

| Symbol | Price |
|--------|-------|
| AAA    | 0.00  |
|        | 1.01  |

42D

| Symbol | Price |
|--------|-------|
| BBB    | 0.00  |
|        |       |
|        | 0.37  |
|        | *     |
|        | 0.39  |

38E

| t | Symbol | Price |
|---|--------|-------|
| 1 | AAA    | 1.01  |
| 2 | BBB    | 0.37  |
| 3 | BBB    | 0.35  |
| 4 | BBB    | 0.39  |
| 6 | AAA    | 1.05  |

40E

| Symbol | Price |
|--------|-------|
| AAA    | 0.00  |
|        | 1.01  |
|        |       |
|        |       |
|        | 1.05  |

42E

| Symbol | Price |
|--------|-------|
| BBB    | 0.00  |
|        |       |
|        | 0.37  |
|        | *     |
|        | 0.39  |

38F

| t | Symbol | Price |
|---|--------|-------|
| 1 | AAA    | 1.01  |
| 2 | BBB    | 0.37  |
| 3 | BBB    | 0.35  |
| 4 | BBB    | 0.39  |
| 5 | AAA    | 1.10  |
| ~~6~~ | ~~AAA~~ | ~~1.05~~ |

40F

| Symbol | Price |
|--------|-------|
| AAA    | 0.00  |
|        | 1.01  |
|        |       |
|        |       |
|        | 1.10  |
|        | ~~1.05~~ |

42F

| Symbol | Price |
|--------|-------|
| BBB    | 0.00  |
|        |       |
|        | 0.37  |
|        | *     |
|        | 0.39  |

38G

| t | Symbol | Price |
|---|--------|-------|
| 1 | AAA    | 1.01  |
| 2 | BBB    | 0.37  |
| 3 | BBB    | 0.35  |
| 4 | BBB    | 0.39  |
| 5 | AAA    | 1.10  |
| 6 | AAA    | 1.05  |

40G

| Symbol | Price |
|--------|-------|
| AAA    | 0.00  |
|        | 1.01  |
|        |       |
|        |       |
|        | 1.10  |
|        | *     |

42G

| Symbol | Price |
|--------|-------|
| BBB    | 0.00  |
|        |       |
|        | 0.37  |
|        | *     |
|        | 0.39  |

| t | from | to | amount | | x | y | z | OD |
|---|------|----|--------|--|---|---|---|-----|
|   |      |    |        | | $10.00 | $20.00 | $30.00 | $0.00 |
| 1 | z | x | $10.00 | | $20.00 |  | $20.00 |  |
| 2 | x | y | $15.00 | | $5.00 | $35.00 |  |  |

42A → row 1, 42B → row 2

| t | from | to | amount | | x | y | z | OD |
|---|------|----|--------|--|---|---|---|-----|
|   |      |    |        | | $10.00 | $20.00 | $30.00 | $0.00 |

44B:

| t | from | to | amount | | x | y | z | OD |
|---|------|----|--------|--|---|---|---|-----|
|   |      |    |        | | $10.00 | $20.00 | $30.00 | $0.00 |
| 2 | x | y | $15.00 | | ($15.00) | $35.00 |  | $10.00 |

44C → $10.00 in OD

44D:

| t | from | to | amount | | x | y | z | OD |
|---|------|----|--------|--|---|---|---|-----|
|   |      |    |        | | $10.00 | $20.00 | $30.00 | $0.00 |
| 1 | z | x | $10.00 | | $20.00 |  | $20.00 |  |
| ~~2~~ | ~~x~~ | ~~y~~ | ~~$15.00~~ | | ~~($15.00)~~ | $35.00 |  | $10.00 |

44F (x column), 44E (z column)

| t | from | to | amount | | x | y | z | OD |
|---|------|----|--------|--|---|---|---|-----|
|   |      |    |        | | $10.00 | $20.00 | $30.00 | $0.00 |
| 1 | z | x | $10.00 | | $20.00 |  | $20.00 |  |
| 2 | x | y | $15.00 | | $5.00 | $35.00 |  |  |

44G (x column), 44H (OD column, shaded)

| t | from | to | amount |
|---|------|-----|--------|
| 1 | z | x | $10.00 |
| 2 | x | y | $15.00 |

72A → row 1, 72B → row 2

| x | y | z | OD |
|---|---|---|-----|
| $10.00 | $20.00 | $30.00 | $0.00 |

→ 74

| t | from | to | amount |
|---|------|-----|--------|
| 1 | z | x | $10.00 |
| 2 | x | y | $15.00 |

| x | y | z | OD |
|---|---|---|-----|
| $10.00 | $20.00 | $30.00 | $0.00 |
| ($15.00) | | $20.00 | |

→ 76

| t | from | to | amount |
|---|------|-----|--------|
| 1 | z | x | $10.00 |
| 2 | x | y | $15.00 |

| x | y | z | OD |
|---|---|---|-----|
| $10.00 | $20.00 | $30.00 | $0.00 |
| ($15.00) | $35.00 | $20.00 | $10.00 |

→ 78

| t | from | to | amount |
|---|------|-----|--------|
| 1 | z | x | $10.00 |
| ~~2~~ | ~~x~~ | ~~y~~ | ~~$15.00~~ |

| x | y | z | OD |
|---|---|---|-----|
| $10.00 | $20.00 | $30.00 | $0.00 |
| $20.00 | | $20.00 | |
| ~~($15.00)~~ | $35.00 | | $10.00 |

→ 80

| t | from | to | amount |
|---|------|-----|--------|
| 1 | z | x | $10.00 |
| 2 | x | y | $15.00 |

| x | y | z | OD |
|---|---|---|-----|
| $10.00 | $20.00 | $30.00 | $0.00 |
| $20.00 | | $20.00 | |
| $5.00 | $35.00 | | ▓▓▓ |

→ 82

Column labels: 84 = x, 86 = y, 88 = z, 90 = OD

| t | s | e | Event | state | access |
|---|---|---|---|---|---|
|   | 1 | 4 | initialize | valid |   |

| g | x |
|---|---|
| 1 | 10.00 |

| g | y |
|---|---|
| 2 | $20.00 |

| g | z |
|---|---|
| 3 | $30.00 |

| g | OD |
|---|---|
| 4 | $0.00 |

138

| t | s | e | Event | state | access |
|---|---|---|---|---|---|
|   | 1 | 4 | initialize | valid |   |
| 2 | 1 |   | x,y,$15.00 | pending |   |

| g | x |
|---|---|
| 1 | 10.00 |

| g | y |
|---|---|
| 2 | $20.00 |

| g | z |
|---|---|
| 3 | $30.00 |

| g | OD |
|---|---|
| 4 | $0.00 |

139

| t | s | e | Event | state | access |
|---|---|---|---|---|---|
|   | 1 | 4 | initialize | valid |   |
| 2 | 1 |   | x,y,$15.00 | pending |   |

| g | x |
|---|---|
| 1 | 10.00 |
| 1 | (15.00) |

| g | y |
|---|---|
| 2 | $20.00 |

| g | z |
|---|---|
| 3 | $30.00 |

| g | OD |
|---|---|
| 4 | $0.00 |

140

| t | s | e | Event | state | access |
|---|---|---|---|---|---|
|   | 1 | 4 | initialize | valid |   |
| 2 | 1 |   | x,y,$15.00 | pending |   |

| g | x |
|---|---|
| 1 | 10.00 |
| 1 | (15.00) |

| g | y |
|---|---|
| 2 | $20.00 |
| 2 | $35.00 |

| g | z |
|---|---|
| 3 | $30.00 |

| g | OD |
|---|---|
| 4 | $0.00 |

142

| t | s | e | Event | state | access |
|---|---|---|---|---|---|
|   | 1 | 4 | initialize | valid |   |
| 2 | 1 |   | x,y,$15.00 | valid | x,y |

| g | x |
|---|---|
| 1 | 10.00 |
| 1 | (15.00) |

| g | y |
|---|---|
| 2 | $20.00 |
| 2 | $35.00 |

| g | z |
|---|---|
| 3 | $30.00 |

| g | OD |
|---|---|
| 4 | $0.00 |
| 3 | $10.00 |

144

| t | s | e | Event | state | access |
|---|---|---|---|---|---|
| 1 | 1 | 4 | initialize | valid |   |
|   | 1 | 2 | z,x,$10.00 | valid | z,x |
| 2 | 1 |   | x,y,$15.00 | pending | x,y,OD |

| g | x |
|---|---|
| 1 | 10.00 |
| 2 | 20.00 |
| 1 | (15.00) |

| g | y |
|---|---|
| 2 | $20.00 |
| 2 | $35.00 |

| g | z |
|---|---|
| 3 | $30.00 |

| g | OD |
|---|---|
| 4 | $0.00 |
| 3 | $10.00 |

146

| t | s | e | Event | state | access |
|---|---|---|---|---|---|
| 1 | 1 | 4 | initialize | valid |   |
|   | 1 | 2 | z,x,$10.00 | valid | z,x |
| 2 | 1 |   | x,y,$15.00 | pending | x,y,OD |

| g | x |
|---|---|
| 1 | 10.00 |
| 2 | 20.00 |
| 1 | (15.00) |

| g | y |
|---|---|
| 2 | $20.00 |
| 2 | $35.00 |

| g | z |
|---|---|
| 3 | $30.00 |
| 1 | $20.00 |

| g | OD |
|---|---|
| 4 | $0.00 |
| 3 | $10.00 |

148

| t | s | e | Event | state | access |
|---|---|---|---|---|---|
| 1 | 1 | 4 | initialize | valid |   |
|   | 1 | 2 | z,x,$10.00 | valid | z,x |
| 2 | 4 | 5 | x,y,$15.00 | valid | x,y |

| g | x |
|---|---|
| 1 | 10.00 |
| 2 | 20.00 |
| 4 | 5.00 |

| g | y |
|---|---|
| 2 | $20.00 |
| 5 | $35.00 |

| g | z |
|---|---|
| 3 | $30.00 |
| 1 | $20.00 |

| g | OD |
|---|---|
| 4 | $0.00 |
| 3 | $10.00 |

| t | g | x     |
|---|---|-------|
|   | 1 | 10.00 |

| t | g | y       |
|---|---|---------|
|   | 2 | $20.00  |

| t | g | z       |
|---|---|---------|
|   | 3 | $30.00  |

| t | g | OD    |
|---|---|-------|
|   | 4 | $0.00 |

| t | g | x       |
|---|---|---------|
|   | 1 | 10.00   |
| 2 | 1 | (15.00) |

| t | g | y       |
|---|---|---------|
|   | 2 | $20.00  |
| 2 | 2 | $35.00  |

| t | g | OD      |
|---|---|---------|
|   | 4 | $0.00   |
| 2 | 3 | $10.00  |

| t | g | x           |
|---|---|-------------|
|   | 1 | 10.00       |
| 1 | 2 | 20.00       |
| 2 | 1 | ~~(15.00)~~ |

| t | g | y       |
|---|---|---------|
|   | 2 | $20.00  |
| 1 | 1 |         |
| 2 | 2 | $35.00  |

| t | g | z       |
|---|---|---------|
|   | 3 | $30.00  |
| 1 | 1 | $20.00  |

| t | g | x       |
|---|---|---------|
|   |   | 10.00   |
| 1 | 2 | 20.00   |
| 2 | 4 | 5.00    |

| t | g | y       |
|---|---|---------|
|   | 2 | $20.00  |
| 1 | 1 |         |
| 2 | 5 | $35.00  |

| t | g | OD    |
|---|---|-------|
|   | 4 | $0.00 |

*FIG. 12*

| t | s | e | Event       | state   | access |
|---|---|---|-------------|---------|--------|
| 2 | 1 |   | x,y,$15.00  | pending |        |

| t | s | e | Event       | state   | access |
|---|---|---|-------------|---------|--------|
| 1 | 1 |   | x,y,$10.00  | pending |        |

| t | s | e | Event       | state | access   |
|---|---|---|-------------|-------|----------|
| 2 | 1 | 3 | x,y,$15.00  | valid | x,y,OD   |

| t | s | e | Event       | state | access |
|---|---|---|-------------|-------|--------|
| 1 | 1 | 2 | x,y,$15.00  | valid | y,z    |

| t | s | e | Event       | state   | access  |
|---|---|---|-------------|---------|---------|
| 2 | 4 |   | x,y,$15.00  | pending | x,y,OD  |

| t | s | e | Event       | state | access |
|---|---|---|-------------|-------|--------|
| 2 | 4 | 5 | x,y,$15.00  | valid | x,y    |

*FIG. 13*

MUTABLE CHRONOLOGIES FOR ACCOMMODATION OF RANDOMLY OCCURRING EVENT DELAYS

CROSS-REFERENCE TO RELATED APPLICATIONS

This application claims the benefit of the Jul. 25, 2014 priority date of U.S. Application No. 62/028,999, the contents of which are incorporated herein by reference.

FIELD OF DISCLOSURE

This disclosure relates to event processing, and in particular, to updating variables in response to events.

BACKGROUND

A typical computer system receives events and updates a state in response to those events.

A state may consist of a set of state variables that represent account balances for various entities. In that case, an event may be a withdrawal or transfer made by one entity. In response to an event, it may be necessary to change the state by updating one or more of the state variables.

In many cases, the state is deterministic. This means that if all events prior to a certain time are known, and all those events are processed in the correct order, the state will be known.

Unfortunately, there is no guarantee that events will arrive in the correct order. As a result, the recorded state, which is what the computer believes the state to be, will not always match the actual state, which is what the computer would have recorded if it had had received the relevant events in the correct order.

The mismatch between recorded state and actual state can cause difficulty. For example, if one were to deposit one's lottery winnings, a first event would be created. If one then wrote a big check soon thereafter, a second event would be created. Under these circumstances, it is quite possible for the second event to reach the bank's computers before the first event reaches the bank's computers. Since the bank's computers have no way of knowing about the first event, the account is assumed to be overdrawn and a penalty is assessed.

Eventually, the first event will reach the bank's computers. At this point, the bank's computers must correct the state.

In complex event processing (CEP) systems, for example, streams of events are processed, while, concurrently, actions are taken based on the results. A set of working data for a CEP system may include different state variables that are being operated on based on different respective streams of received event data (e.g., event data such as database requests, financial transactions, weather data, or traffic data). The order of the original sequence of individual events may have an effect on the processing to be performed. In some cases, the state reflected by the state variables may be incorrect if the processing of events occurs out of order.

The process of correcting the state is not so simple, particularly in a multi-core or multi-node environment. In many cases, updating a state will involve updating multiple state variables in working storage. This raises the risk of deadlock between two different update computations that depend on each other to make forward progress. To alleviate this deadlock risk, some systems use a form of concurrency control (e.g., pessimistic concurrency control using locks and two-phase commit, or optimistic concurrency control without locks but with a non-local verification procedure). In addition, the overall system should be resilient enough to at least survive failure of a node or core, and to recover the state after such a failure.

Conventional approaches to event processing involve a fault-tolerant distributed database that incorporates complex and time-consuming distributed algorithms. Building such a system and making it perform well (e.g., with low latency) at high peak levels of service is generally difficult. For example, making it perform at the level of millions of events per second with sub-millisecond responsiveness is a daunting prospect to say the very least.

SUMMARY

In one aspect, in general, a method for causing a computing system to process events from a sequence of events that defines a correct order for said events independent from an order in which those events are received over an input device or port includes: defining a first variable, defining, for the first variable, a first chronology of operations on the first variable that are associated with received events, receiving a first event that pertains to the first variable, executing a first operation on said first variable, which results in a first update of the first chronology, after having received the first event, receiving a delayed event that pertains to the first variable, executing a second operation on said first variable, which results in a second update of the first chronology, and determining whether the first update is valid or invalid, wherein the delayed event precedes the first event in the sequence, wherein the first update is based on the first event, and wherein the second update is based on the delayed event.

In some practices, determining whether the first update is valid or invalid includes determining that the first update is valid. Among these practices are those practices in which determining that the first update is valid includes determining that the first update is the insertion of a write operation before the first update, those practices in which determining that the first update is valid includes determining that the delayed event resulted in insertion of a read operation before the first update, and those in which determining that the first update is valid includes determining that the delayed event required insertion of an update operation before the first update.

In some practices of the method, determining that the first update is valid includes determining that the first update is not affected by the second update.

In some practices, determining whether the first update is valid or invalid includes determining that the first update is affected by the second update, and rescinding the first update in response to determining that said first update is invalid.

In other practices, determining whether the first update is valid or invalid includes determining that the first update is affected by the second update, causing said first update to be invalid. Among these practices are those in which determining that the first update is affected by the second update includes determining that the delayed event required insertion of a chronology entry indicating an operation that includes writing said first variable before a chronology entry corresponding to the first update, and those in which determining that the first update is affected by the second update includes determining that the delayed event required updating an existing chronology entry indicating an operation on said first variable before a chronology entry corresponding to the first update.

In some cases in which the correct order for the sequence of events is partially ordered, practices of the method include causing the events to be completely ordered.

In alternative practices, receiving the first event includes receiving the event from a set of completely ordered events.

Among the practices of the method are those that also include detecting a loss of data in the first chronology (e.g., a portion of the first chronology stored on a device or node that experienced a failure), retrieving a first checkpoint value indicative of a valid value of the first variable in the first chronology, based on the checkpoint value, retrieving a subset of events from a list of events, the list of events including the first event, reprocessing the subset of events, thereby reconstructing the data lost in the loss of data, and revising the first chronology to include the data lost in the loss of data.

In yet other practices, the first chronology includes a plurality of entries corresponding to operations resulting from a plurality of events that are after an entry corresponding to a delayed event operation corresponding to the delayed event. Some of these practices include those in which executing a second operation that causes a second update of the first chronology includes identifying a barrier operation that blocks propagation of invalidity in the plurality of entries, and revising only those operations from the plurality of operations whose entries are between entries corresponding to the delayed event operation and the barrier operation. Among these practices are those in which identifying a barrier operation includes identifying a write operation as a barrier operation.

In alternative practices, determining whether the first update is valid includes identifying an access to the first chronology that must have occurred to correctly execute the first update, inspecting the first chronology, and based on the inspection, determining whether the access has occurred. Among these practices are those that further include maintaining first information, which identifies an access to the first chronology, and second information, which identifies a range of accesses required to process the first event, and determining that the first information is within the range of accesses.

In other practices, the computing system includes a plurality of nodes in communication over a network, and the method further includes causing the computing system to execute the steps of storing the first variable and the first chronology at a first node; storing a second variable and a second chronology of operations on the second variable at a second node; and processing at least some events of the sequence of events by performing operations on both the first and second variables, and updating both of the first and second chronologies in response to processing the events.

Other practices include compatible combinations of any of the foregoing practices.

In another aspect, the invention features software, stored in non-transitory form on a computer-readable medium, for causing a computing system to process events from a sequence of events that defines a correct order for said events independent from an order in which those events are received over an input device or port, the software including instructions for causing a computing system to carry out any of the foregoing methods.

In yet another aspect, the invention features a computing system for processing events from a sequence of events that defines a correct order for said events independent from an order in which those events are received over an input device or port, the computing system including: an input device or port configured to receive said events, and at least one processor configured to participate in processing of the sequence of events, the processing including any of the foregoing methods.

In yet another aspect, the invention features a computing system for processing events from a sequence of events that defines a correct order for said events independent from an order in which those events are received over an input device or port, the computing system including: means for receiving said events, and means for carrying out any of the foregoing recited steps.

Aspects can have one or more of the following advantages.

The techniques described herein are based on adding an explicit temporal dimension to all computations but nevertheless de-coupling this temporal dimension from the order in which the computations are performed. The result is a system that incrementally builds up a chronology of entries (called "frames") indicating operations performed in responds to events and consequent state changes. As the chronology is updated in response to received events, the chronology eventually converges to a deterministic final state. Eventually, once all events have been received and all computations resulting from those events have been completed, the chronology will have converged to a unique chronology. For example, the system may determine that a sequence of events has finished based on known limits on a delay interval by which an event could be delayed. If there is a point at which no additional events will arrive, the system converges to a deterministic final state. But it may do so by following a path that is not necessarily deterministic.

In some embodiments, the need for expensive (in terms of computing time and/or resources) concurrency control procedures can be avoided. For example, procedures like two-phase commit are not needed. Additionally, there is no need for a non-local verification procedure that requires communication between remote nodes. Instead, verification can be achieved using only local processing. Additionally, a recovery procedure is described in which correct local state can be restored after failure of a node without necessarily having to reprocess all stored events. Updates of local state after a delayed event can also be performed without necessarily having to reprocess all stored events whose order is after the delayed event.

BRIEF DESCRIPTION OF THE FIGURES

FIG. 5 illustrates steps in execution of the method when events arrive in the correct order;

FIG. 6 illustrates steps in execution of the method when events arrive out of order;

FIG. 7 illustrates a more complicated example similar to that in FIG. 5;

FIG. 8 illustrates a more complicated example similar to that in FIG. 6;

FIG. 9 shows why the implementation does not require latches;

FIG. 11 shows the use of generation counters;

FIG. 12 shows the possible states of chronologies for the activity described in FIG. 11;

FIG. 13 shows the possible states for event frames for the activity described in FIG. 11.

DETAILED DESCRIPTION

Figures 1, 2, 3:
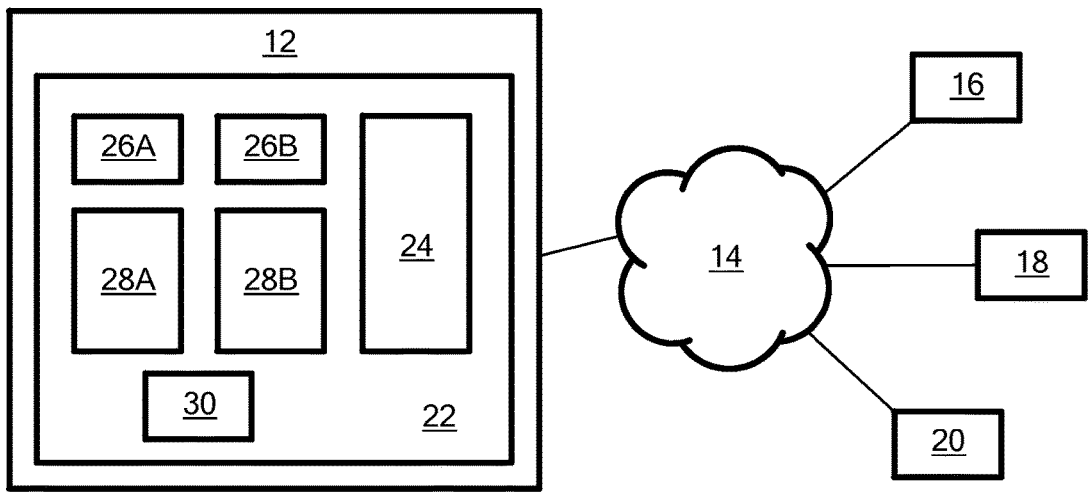
FIG. 1 shows an event-processing apparatus.
FIG. 2 shows additional fields that make up an event.
FIG. 3 shows an abbreviated and expanded representation of a chronology.

Referring to FIG. 1, an event ingestor 12 has a connection to a network 14. Various event sources 16, 18, 20 are also connected to the network 14. Although only one event ingestor 12 is shown, more than one such machine can be provided. In general, each event ingestor 12 can access not only its own locally stored data but data stored by another event ingestor by exchanging messages over the network 14 as needed. In some embodiments, a multi-node computing system includes various nodes that are each configured to include one or more event ingestors and/or one or more event sources. In some embodiments, each event ingestor is implemented on its own node in the network 14, physically or geographically separated from each other node but in communication over some path through the network 14.

Surrogate Timestamps

Each event source 16, 18, 20 produces events. The network 14 transports these events from the event source 16, 18, 20 to an event ingestor 12, for example, by transmitting (or broadcasting) event data over the network 14. When event data is received at the event ingestor 12, it may be recognized as representing an event that is to be handled by an event-handler. For example, an event-handler may perform a calculation in response to the event, which may involve performing operations on one or more variables representing a working state, as described in more detail below.

The events are ordered. In some examples the ordering is temporal, where each event occurs at a particular point in time. That time of occurrence can be represented in a variety of ways. For example, the time of occurrence for an event may correspond to a value of a timestamp included with the event data. If no two events occur at the exact same time, the resulting event sequence is completely ordered.

As a practical matter, it is possible for two events to be marked as having occurred at the same time even if there is some small difference in their actual times of occurrence. A common way this can arise is if two events occur closer together than the granularity with which time is measured. In this case, the sequence will be partially ordered.

For an event ingestor 12 to implement the method described herein, the event sequence must be completely ordered, not just partially ordered. One method of converting a partially ordered sequence into a completely ordered sequence is to provide a surrogate timestamp to function as a tiebreaker.

One method of assigning a surrogate timestamp is to maintain a set of counters, each one of which corresponds to an event source 16, 18, 20. Each counter is then initialized to a unique seed. In some examples, the seed is a positive integer that is less than the number of event sources. For example, for three event sources, the seed may be "1" or "2."

When an event source 16 generates a new event, it increments its counter by the number of event sources. The event source 16 then tags the event with a surrogate timestamp that includes the original timestamp for the event with the incremented value of the counter appended to that timestamp. Only then does the event source 16 send the new event on to the event ingestor 12. This process ensures that the event ingestor 12 receives only a set of completely ordered events. To simplify exposition, throughout the remainder of this disclosure, it will be assumed that the surrogate timestamp is simply an integer value of such a counter, without explicitly showing the original timestamp value (which still guarantees a completely ordered sequence of events).

In other examples, instead of a temporal ordering, the events may be associated with some other type of quantitative metric that that determines a completely ordered sequence of events, or a partially ordered sequence of events that can be converted into a completely ordered sequence using a tiebreaker.

Saving an Event

After an event has been received at the event ingestor 12 and given a surrogate timestamp, it is retained and made durable. This can be carried out in a variety of ways. For example, the event can be written to a durable storage medium, such as a hard disk drive (or other non-volatile storage medium). Or, the event can be transmitted to another, fully independent event-processing apparatus.

Event durability permits re-processing the event, both in connection with event processing and to facilitate recovery in case of data loss. The event ingestor 12 undertakes no event processing until the event has been made durable.

Delayed Events and Processing Order

In the course of the journey from an event source 16, 18, 20 to the event ingestor 12, an event can become delayed. This may be for a variety of reasons, such as network congestion, propagation delay, or retransmission of event data due to corruption or packet loss. As a result of event delays, events do not necessarily reach the event ingestor 12 in an order that is consistent with the order in which the events actually occurred (e.g., according to the order of their surrogate timestamps).

Data Structures

The event ingestor 12 features storage 22 in which is stored an event list 24, a set of first and second variables 26A, 26B (generally 26), and a set of corresponding first and second chronologies 28A, 28B (generally 28). Although two variables and two chronologies are shown, this is for illustration only. The method described herein is applicable to one or more variables and one or more corresponding chronologies.

The values of the variables 26 define a working state of the event ingestor 12. An event-handler 30 enables the event ingestor 12 to change the working state as events arrive. For example, the event-handler 30 may use a rule processing engine to evaluate a set of rules based on incoming event data and trigger certain rules in response to certain rule conditions being met. The triggered rules may then perform a corresponding action.

So, for each incoming event, the event-handler 30 performs an action, which may involve operations on the variables 26. These actions are tied to whatever point in time corresponds to the event (according to its surrogate timestamp). However, because the actions are carried out in response to an event's arrival, and because the events do not necessarily arrive in the correct order, the actions will also not be executed in the correct order. In fact, it would be quite common for the actions to be executed in an order that is inconsistent with the temporal order of the underlying events with which they are associated. As a result, there will be times in which the states for each variable are inconsistent with what they would have been had the events arrived in sequence.

Each chronology 28 is associated with a corresponding variable 26. A chronology 28 includes a record of a set of events that affect that variable, as well as the actions that result from the occurrence of that event. These actions include rule invocations, and state changes in the form of specific operations performed on the variable 26 corresponding to the chronology 28.

As events arrive, the event-handler 30 incrementally builds the chronology 28 by updating the chronology 28 for each new event received, for example, by adding a new frame, as described in more detail below. However, the chronology 28 is not immutable. When a delayed event arrives, and is processed out of order, the chronology 28 can be revised.

Anatomy of an Event

As shown in FIG. 2, each event has a surrogate timestamp 64 and a body 66. The surrogate timestamp 64 ensures that the event sequence is fully ordered. The body 66 specifies what tasks are to be carried out in connection with the event. In addition, each event also has a state field 68 and an accessed variables field 70.

The event's state field 68 indicates whether the event is pending, valid, or invalid. Every event starts out as pending. It stays pending until all tasks associated with the event are completed. Then, the event becomes valid. A valid event may become invalid if a delayed event that precedes it in time arrives. When an event becomes invalid, an event-handler 30 must be spawned to re-process it.

The event's accessed-variables field 70 lists all the variables that were accessed when that event was processed. It is initially blank and is updated after an event has been processed or reprocessed.

Upon receiving an event, the event ingestor 12 spawns an event-handler 30 for that event. The event-handler creates an entry in the event list 24 and marks it "pending." Then, the event-handler 30 accesses one or more variables using an operation determined by the event-handler 30 (e.g., an operation that reads, writes, or both reads and writes the value of a variable 26). As it does so, it accumulates a list of the variables that were accessed, and, when it terminates, stores this list in the accessed variables field 70.

Upon completion, the event-handler 30 inspects the state field 68 for the event. If the state field 68 is still set to "pending," the event-handler 30 sets it to "valid." However, it is possible that while the event-handler 30 was busy carrying out its event processing, a delayed event arrived. This means that the event ingestor 12 spawned an event-handler for that delayed event, which might then have set the state field from "pending" to "invalid." If this happens, the event-handler 30 sets it back to "pending" and reprocesses the event.

When an event-handler 30 reprocesses an event, it first receives a list of all accessed variables. As it accesses variables during reprocessing, it uses the list of accessed variables to identify those variables that are being revisited. When it revisits an accessed variable, it marks it as valid. Since the event-handler knows all the variables, and knows all those that have been accessed, it can easily determine which variables were not accessed. It then proceeds to delete frames associated with those variables, as described in more detail below.

Anatomy of a Chronology

Chronologies are represented as a sequence of time-keyed frames 54 (FIG. 3), each of which corresponds to an event. FIG. 3 shows a typical chronology in both an abbreviated format 50 and an expanded format 52. The expanded format 52 explicitly shows each field of the frame 54. The abbreviated format 50 omits certain fields, but incorporates the information in those fields by judicious use of strikethroughs and asterisks. For compactness of representation, this disclosure will often make use of the abbreviated format 50, which also identifies in the value field header the name of the variable for which the chronology lists the sequence of operations and resulting values for that variable.

The illustrated chronology 52 shows five frames, each of which has four fields. In response to receiving an event, the event-handler 30 adds a frame 54. This new frame 54 has a time field 56, a type field 58, a value field 60, and a validity field 62.

The time field 56 stores a surrogate timestamp. In the abbreviated format, a blank indicates start of time. The "downstream" direction in a chronology is in the direction of increasing values of the timestamp. The "upstream" direction is the opposite of the downstream direction.

The type field 58 indicates the type of frame, which corresponds to the type of operation that is performed on the variable in response to the event associated with that frame. There are fundamentally two kinds of frames: read frames and write frames. The write frames subdivide into two more types: a blind-write frame, and a read-write frame.

A "read" frame is added when, as a result of a received event, the value of the variable corresponding to the chronology is read, but no writing takes place. The illustrated chronology shows two read frames, one at t=20 and another at t=40. In the abbreviated format, an asterisk indicates a read frame.

A "read-write" frame is added when, as a result of a received event, a value of the variable corresponding to the chronology has been both read and a new value of that variable has been written into the chronology. In general, the value written depends on the value that was read. The illustrated chronology has two read-write frames, one at t=30 and another at t=50. These are indicated in the abbreviated format by the written value with no bar above the value. For compactness of representation, the expanded format refers to a read-write frame as an "update."

A "blind-write" frame is added when, as a result of a received event, a value in the chronology has been overwritten, but without having been read. The illustrated chronology has only two blind-writes. One is upon initialization at t=0 and the other is at t=10. In the abbreviated format, a blind-write is indicated by a solid line above the value that was blindly written. For compactness of representation, in the expanded format, a blind-write is referred to as an "overwrite."

The distinctions between a read, a read-write, and a blind-write are important because they will eventually be used to determine whether the event that spawned the frame will need to be reprocessed in response to receiving a delayed event.

The value field 60 includes the newest value of the variable as of the time that the frame 54 was added. This value field 60 is only used when the type field 58 indicates that the frame 54 is a blind-write frame or a read-write frame.

Finally, the validity field 62 indicates whether or not the frame 54 is valid. A frame starts out as valid. But as new events arrive, it can be rendered invalid. In the abbreviated format, valid and invalid values are indicated by the absence and presence of a strike-through.

In response to an event, the event-handler 30 updates a chronology (which is different from the "updates" performed on the variables) by performing operations on a chronology involving its frames (which are different from the "operations" performed on the variables). In general, there are four kinds of operations on a chronology: an "append," an "insert," a "modify," and a "delete."

An "insert" operation adds a frame before the last frame of a chronology. An "append" operation is like an insert, except it inserts the frame after the last frame of a chronology. A "modify" changes something in the frame. And a "delete" removes a frame from a chronology altogether.

Significant and Insignificant Operations

A particular operation to update a chronology 28 is either "significant" or "insignificant." A "significant" operation will result in a revision, or change, to a value that is visible at a later point in a chronology. More specifically, a "significant" operation will affect the outcome of actions that were temporally after the delayed event, with the result that consequent state changes resulting from those actions may need to be rescinded.

Figure 4A:
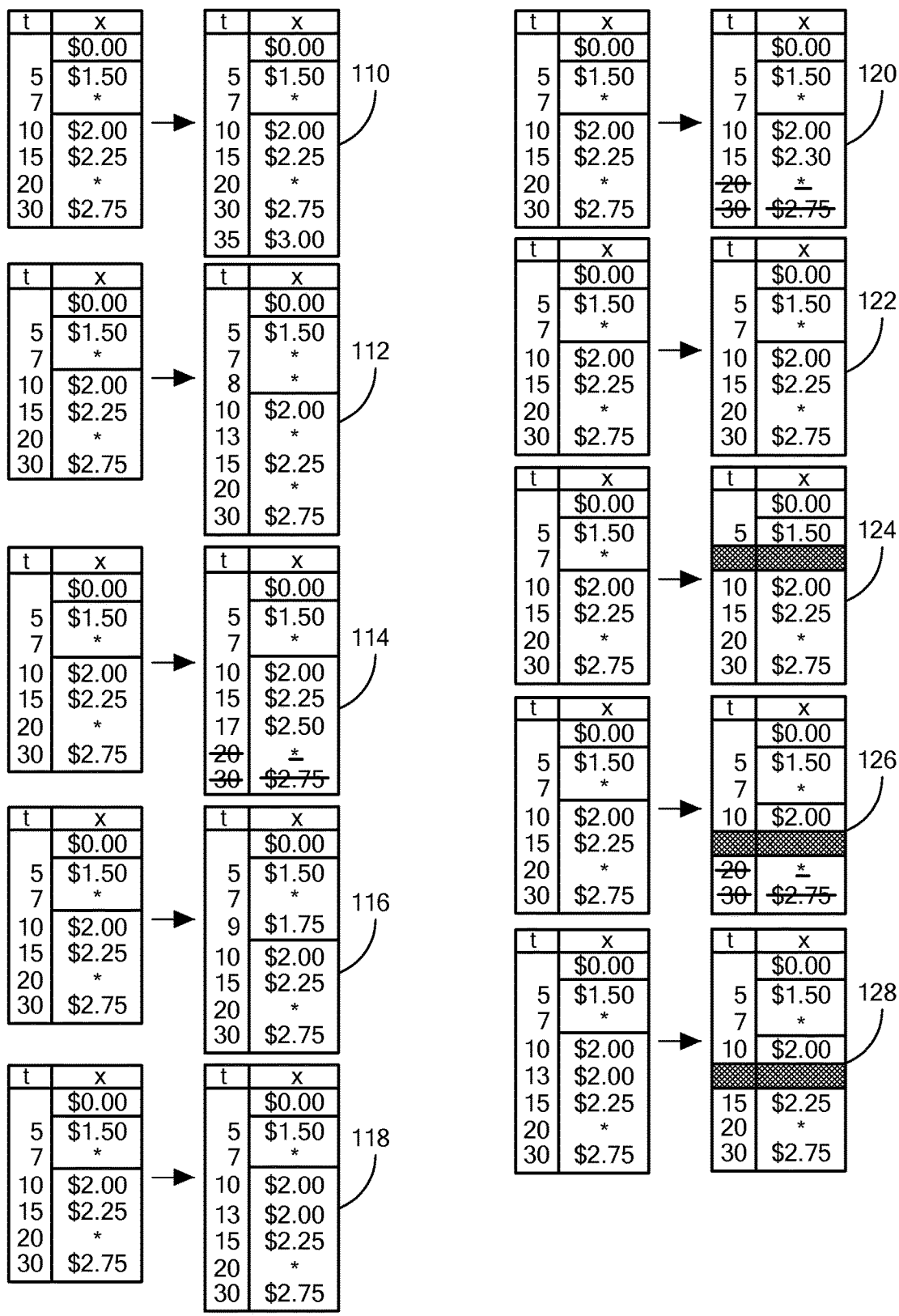
FIGS. 4A-4B show examples of significant and insignificant operations on a chronology.
Figure 4B:
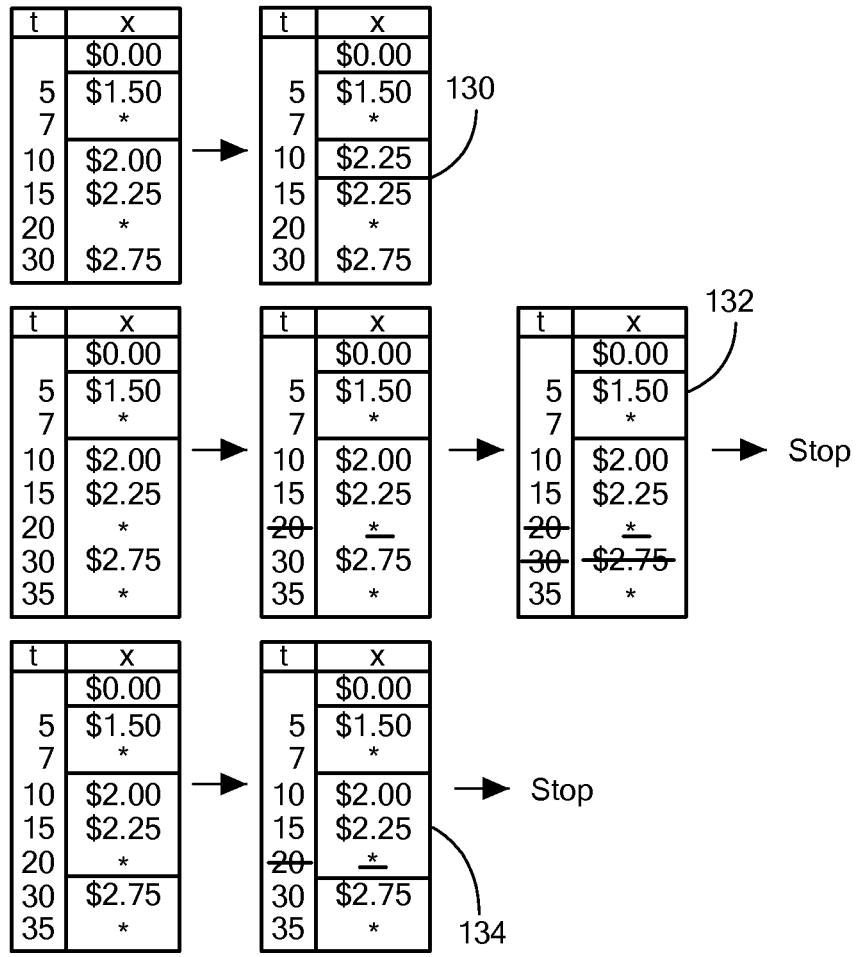

FIGS. 4A-4B illustrate some examples of how one determines if an insertion of a frame in a chronology is a significant insertion or an insignificant insertion. In general, an insert operation is significant if it calls into question values that are located downstream from it.

In the operation 110 shown in FIG. 4A, an event has caused an append operation that results in an append frame with the value $300 at t=35. This operation is not significant because there are no downstream values after t=35 that could possibly be affected. In general, an append operation cannot be significant (i.e., will always be insignificant), because it is by definition after the last frame.

In operation 112, a delayed event has caused insertion of a read frame at t=8. This operation is not significant because a read cannot affect values in the chronology. In general, a read operation will always be insignificant, because it does not change the value being read.

A blind-write or a read-write can sometimes be significant because it can sometimes cause subsequent frames to be invalid.

In operation 114, a delayed event at t=17 has caused a read-write operation resulting in insertion of a read-write frame. At the time the downstream read frame at t=20 was generated, the delayed event would not yet have arrived. Therefore, the event-processor would have read the value $2.25. But as a result of the delayed event at t=17, this would now be incorrect. As a result, the downstream read frame at y=20 must be invalidated. This invalidity will later be corrected by reprocessing the event at t=20.

Similarly, the downstream read-write frame at t=30 is invalidated because it involved a read operation. Because the delayed event would not yet have arrived at the time this read-write frame was added, the read-write frame is based on having read a value that is now known to be incorrect. As a result, it too must be marked invalid.

In general, a read-write frame will invalidate all downstream frames that involve a read, whether as a result of a read operation or a read-write operation. However, a blind-write operation, which requires no read, will not be invalidated.

Not all read-write operations will trigger invalidity propagation. In operation 116, a delayed event has caused insertion of a read-write frame at t=9 just before a blind-write frame at t=10. Yet, this does not invalidate the blind-write frame. This is because a blind-write frame does not involve reading anything. Therefore, the value written in a blind-write could not possibly be affected by upstream values in the chronology. Any frame downstream from a blind-write that involves a read would also not be invalid because such a read would read the value in the blind-write frame. Thus, a blind-write frame acts as a kind of barrier frame that blocks downstream invalidity propagation.

Insertion of a read-write operator thus causes invalidity to propagate downstream from its point of insertion. This invalidity propagates until either the end of the chronology or until a barrier frame, such as a blind-write frame is reached. The barrier frame thus operates as a barrier that stops invalidity from propagating past it. This limits the extent of reprocessing required in response to a delayed event. Instead of having to reprocess all events that come after insertion of a read-write frame, only those events that come before a blind-write will need to be reprocessed.

A read-write frame does not always invalidate downstream frames that involve a read. For example, in the configuration 118, a delayed event has caused insertion of a read-write frame at t=13 directly after the blind-write at t=10. But this read-write frame does not trigger downstream invalidity propagation because the value in the read-write frame at t=13 is the same as that in the blind-write frame at t=10. Thus, the read-write frame at t=13 really makes no difference. Values read by any downstream read operations or read-write operations would not have changed as a result of the insertion of a read-write frame at t=13.

FIGS. 4A-4B also illustrate some examples of how one determines if modification of a frame in a chronology is a significant or insignificant. Like the insert operation, the modify operation sometimes, but not always, renders downstream frames invalid.

In the operation 120, a delayed event has caused the frame at t=15 to be modified to have a new value, $2.30. This starts downstream invalidity propagation. The invalidity propagation continues until it reaches either a barrier frame or the end of the chronology. The reason it does so is the same as that discussed in connection with the read-write frame.

On the other hand, in the operation 122, a delayed event has caused the frame at t=15 to be modified. But the modified value of the frame at t=15 is the same as its original value. This obviously cannot affect anything downstream. Therefore, this modification is insignificant.

FIGS. 4A-4B also illustrate some examples of how one determines if deletion of a frame from a chronology is significant or insignificant. Like the insert operation and the modify operation, a deletion operation sometimes, but not always, renders downstream frames invalid.

First of all, deleting a read frame, as shown in the operation 124, is never significant. After all, if inserting a read frame made no difference, it would seem odd for deleting the same read frame to make any difference.

On the other hand, deleting a blind-write frame or a read-write frame will be significant if it changed a value, as shown in the operation 126, but not if it made no change to a value, as shown in the operation 128.

Operation 130 illustrates a blind-write frame acting as a barrier frame that prevents invalidity from propagating downstream. In the example shown, a delayed event has caused a modification to the frame at t=10. Ordinarily, this modification would be significant for reasons discussed above in connection with operation 120. However, the immediately following frame at t=15 is a blind-write frame. This operates to immediately block invalidity propagation downstream. Thus, no frames are rendered invalid.

In some embodiments, not all potentially invalid frames are marked. This is because in some cases, whether or not a frame is invalid is a function of the correct value of one or more invalid frames.

For example, in operation 132, a read-write frame is inserted at t=15. As expected, the read at t=20 is marked invalid. Since the read-write frame at t=30 depends on what is read at t=20, it too is marked invalid. Since the read frame at t=35 is also downstream from the significant insertion at t=15, one might expect it to also be marked invalid. And in fact, in one embodiment, this would be the case.

However, it is also possible that when the event at t=30 is ultimately reprocessed, the value at t=30 will ultimately be replaced by $2.75. This means it will not have changed. In that case, the read frame t=35 would not be invalid.

Because there is a possibility that the read frame at t=35 will ultimately be valid, it remains marked as valid. Whether or not it truly is valid will not be known until the event at t=30 has been reprocessed. If, upon reprocessing the event at t=30, it is found that the read frame at t=35 has been rendered invalid, then and only then will the read frame at t=35 be marked invalid.

The foregoing method, in which the validity of a valid frame remains unresolved in the face of a significant operation upstream from it, reduces computational load by avoiding unnecessary event re-processing. Such a frame thus also a barrier frame in the same way that a blind-frame is a barrier frame. The difference between the two is that a frame of unresolved validity forms a conditional barrier, whereas a barrier formed by a blind-write frame forms an unconditional barrier.

The operation 134 is similar to operation 132 with the exception that the frame at t=30 is a blind-write frame instead of a read-write frame. In this case, the frame at t=30 is an unconditional barrier frame, rather than a conditional barrier frame as was the case in operation 132.

In the method described herein, as computation progresses, the probability of rescinding a state change in a chronology 28 approaches zero. As a result, a chronology 28 converges to its deterministic final state.

EXAMPLE 1

Cumulative Maximum with No Event Delays

FIG. 5 illustrates steps in execution of the method in the absence of event delays for an event list 32. The illustrated process concerns tracking the maximum value attained by of each of two variables "AAA" and "BBB." These variables might represent, for example, stock prices. These The event list 32F shows six events, each of which corresponds to a value for one of the two variables.

Upon receiving the first event, the event-handler 30 updates the event list 32A to indicate the value of the first variable. The event-handler 30 also initializes a first chronology 34A for the first variable and enters the appropriate value.

Upon receiving the second event, the event-handler 30 updates the event list 32B to indicate the value of the second variable. The event-handler 30 also initializes a second chronology 36B for the second variable and enters the appropriate value.

Upon receiving the third event, the event-handler 30 updates the event list 32C. Since the event concerns the second variable, the first chronology 34C is unchanged. The event-handler 30 peeks at the second chronology 36C. This act of peeking is recorded in the second chronology 36C. An asterisk in the illustration of the second chronology 36C represents the recordation of this act of peeking. However, since the value received in the third event is lower than the value already in the second chronology 36C, no change has to be made to the second chronology 36C.

Upon receiving the fourth event, the event-handler 30 updates the event list 32D. Since the event concerns the second variable, the first chronology 34D is unchanged. The event-handler 30 peeks at the second chronology 36D and discovers that this time, the maximum value of the second variable has changed. As a result, it updates the second chronology 36D.

Upon receiving the fifth event, the event-handler 30 updates the event list 32E. Since the event concerns the first variable, the second chronology 36E is unchanged. The event-handler 30 peeks at the first chronology 34E and discovers that the maximum value of the firs variable has changed. Therefore, the event-handler updates the first chronology 34E.

Upon receiving the sixth event, the event-handler 30 updates the event list 32F. Since the event concerns the first variable, the second chronology 36F is unchanged. The event-handler 30 peeks at the first chronology 34F. This act of peeking is recorded in the first chronology 34F. An asterisk in the illustration of the first chronology 34F represents the recordation of this act of peeking. However, since the value received in the sixth event is lower than the value already in the first chronology 34F, no change has to be made to the first chronology 34F.

As is apparent, the first and second chronologies 34F, 36F have converged to the state that one would expect given the complete list of events 36F.

EXAMPLE 2

Cumulative Maximum with Event Delays

FIG. 6 considers the case in which the events shown in the event list 36F arrive in the wrong order.

Upon receiving the first event, the event-handler 30 updates the event list 38A to indicate the value of the first variable. The event-handler 30 also initializes a first chronology 40A for the first variable and enters the appropriate value.

Upon receiving the second event, the event-handler 30 updates the event list 38B to indicate the value of the second variable. The event-handler 30 also initializes a second chronology 42B for the second variable and enters the appropriate value.

However, as a result of event delays, the next event to arrive, however, is not the third event but the fourth event. Upon receiving the fourth event, the event-handler 30 updates the event list 38C to indicate the value of the second variable. The event-handler 30 also updates the second chronology 42C. Since the event does not involve the first variable, the event-handler 30 leaves the first chronology 40C alone.

Then, the third event finally arrives. Upon receiving it, the event-handler 30 updates the event list 38D by inserting the third event in the correct position. Since the third event concerns only the second variable, the first chronology 40D can be left alone.

The event-handler 30 peeks at the second chronology 42D. The event-handler 30 then updates the second chronology 42D by recording this peek, as indicated by the asterisk. Based on the nature of the update caused by the operation, the event-handler 30 must now classify this operation as significant or insignificant.

To do so, the event-handler observes, from having peeked at the second chronology 42D, that the value of the second variable in the third event is not high enough to change anything. As a result, the operation is deemed insignificant and the event-handler 30 also leaves the value of the second variable in the second chronology 42D alone.

Again, as a result of event delays, the next event to arrive is the sixth event, not the fifth one. The event-handler updates the event list 38E accordingly, updates the first chronology 40E, and leaves the second chronology 42E alone. However, in reality, the first chronology is now incorrect because a higher value is reflected in the delayed fifth event.

Finally, the fifth event arrives. The event-handler 30 updates the event list 38F by inserting the fifth event in the correct location. Since the fifth event does not affect the second chronology 42F, the event-handler 30 concerns itself with only the first chronology 40F.

In particular, the event-handler 30 updates the first chronology by inserting the fifth event in the correct location in the first chronology. It then checks to see if the update caused by the operation associated with this fifth event is sufficient to classify the operation as significant.

In doing so, the event-handler 30 peeks at the values for events after the fifth event in the first chronology 40F. It discovers that the event-handler that handled the sixth event relied on a value that has been rendered incorrect by the update. Thus, based on the update it caused, this operation on the first chronology 40F is deemed significant.

In response to determining that an operation is significant, the event-handler 30 for the fifth event marks the actions carried out by the event-handler 30 for the sixth event as invalid. This is shown by the entries that have been stricken-through in the first chronology 40F and in the event list 38F.

Because a significant operation occurred, the event-handler re-runs the event-handlers for all affected events. In this case, the only affected event is the sixth event.

The event-handler 30 for the sixth event then processes the sixth event once again. In doing so, it writes over the entry of the sixth event in the event list 38G and peeks at the first chronology 40G. An asterisk in the first chronology 40G indicates that the peek has been recorded. The event-handler 30 then recognizes that no update to the first chronology 40G is necessary since the value of the sixth event is less than the current maximum value.

It is apparent that the chronologies in FIG. 5 and FIG. 6 managed to converge to the same final values. However, the intermediate states of the chronologies in FIG. 6 included at least one incorrect state, whereas in FIG. 5, the chronologies are always in the correct state. Thus, the paths followed from the initial state to the final state in FIGS. 5 and 6 were different.

Upon arrival of an event, the event processing system spawns an event-handler 30 to process the event. The event-handler accesses the variables and the chronologies of those variables. These variables are shared and can be accessed by other event ingestors 12. As it does so, it builds frames and other data structures that are used in connection with determining what events need to be reprocessed. Then, the event-handler 30 terminates.

EXAMPLE 3

Clearing Payments: No Event Delays

FIG. 7 illustrates another example in which there are three accounts, X, Y, and Z, each associated with a bank customer, and a fourth account, OD, that collects fees for overdrafts. In this example, if a customer's balance is overdrawn by less than a defined cap, a $10 overdraft fee is debited from that customer's account and credited to the bank's overdraft account.

This scenario is one that is particularly ripe for the sort of trouble that can be caused by a delayed event. For instance, it is quite common for one to replenish a depleted account by depositing a large check, and to then immediately start paying bills. This began a race. If the bills were to win the race, i.e., if the bills are processed before the check has cleared, there would be a flurry of overdraft charges.

In the past, this rarely happened because bills were often paid by mail, effectively handicapping one of the racers. However, in modern transaction processing, many bills are paid electronically, effectively removing this built-in handicap.

In FIG. 7, there are no delayed events. The process begins with transferring money from account Z to account X (step 42A), thus raising X's balance from $10 to $20. As a result, when X pays off his $15 debt to Y (step 42B), X's $20 balance is sufficient, and no overdraft occurs.

EXAMPLE 4

Clearing Payments: Event Delays

FIG. 7 starts with the same initial state 44A. However, the event communicating the transfer from account Z to account X is delayed (step 44B). As a result, when the $15 transfer from account X to account Y is processed, account X has only $10. Because of this, an overdraft fee is credited to account OD (step 44C).

The delayed event finally arrives (step 44D). The first step is to update account Z and X by debiting the former $10 (step 44E) and crediting the latter $10 (step 44F). The update to account X renders the earlier event invalid. Note that the value in the Y account is not invalidated.

As a result of having been rendered invalid, the earlier event must be reprocessed. This results in correcting the value for account X (step 44G) and deletion of the overdraft in account OD (step 44H).

Once again, the four chronologies have converged into the correct state.

EXAMPLE 5

Asynchronous Processing

In the course of processing an event, it may be necessary to update several variables. It is advantageous, at least in conventional methods, for an event processing operation to be atomic. This generally requires that obtaining latches (or "locks") on all variables to be updated. This is a temporally expensive operation. In addition, it creates the possibility of deadlock.

The method described herein dispenses with the need for atomicity in an event processing operation. Instead of obtaining multiple latches, variables are updated in a globally asynchronous manner. At times, the resulting configuration of variable values may be incorrect. However, the nature of the method is such that, in the long run, the configuration of variable values will converge to a correct state. A latch on the chronology may be may be obtained to enable atomic an atomic set of operations to the chronology (e.g., inserting and deleting frames), such brief local latches on a chronology are less expensive than latches on the variables themselves, which may be shared among multiple nodes.

As shown in FIG. 8, a first event 72A and a second event 72B arrive at almost the same time, as a result of which first and second event-handlers are executing concurrently. The first event 72A requires that $10 be transferred from account Z to account X. This requires two operations: a debit to account Z and a credit to account X.

The first event handler manages to perform the debit from account Z (step 74) by updating a chronology 88 for account Z. However, before it has a chance to carry out the corresponding credit to account X, the second event handler steps in to process the second event 72B. This results in an update to the chronology 84 for account X that shows a debit $15 from account X. This triggers an overdraft in account X (step 76). It also results in an apparent disappearance of $10 that was supposed to have been moved into account X.

The second event-handler, which is completely oblivious to the fact that it interrupted the first event-handler, completes processing the second event 72B by updating a chronology 90 for account OD, thus crediting the bank's overdraft account (step 78).

Finally, the first event-handler finishes processing the first event 72A. This restores the missing $10 into account X and also invalidates the processing carried out by the second event-handler (step 80).

Invalidation of the second event 72B triggers the spawning of an event-handler to re-process the second event 72B. This results in correction of the balance, and deletion of a frame from the overdraft chronology (step 82). As a result, the chronologies 84, 86, 88, 90 have converged to the correct states without the use of latches.

EXAMPLE 6

Chronology Reconstruction

Due to potentially frequent events, and their associated operations, chronologies are typically stored in relatively fast storage (e.g., memory or other volatile storage). However, this leaves chronologies vulnerable to data loss in the event of hardware failure. The method described herein provides a simple way to reconstruct all or part of a chronology that may have been lost as a result of a hardware failure. To enable this feature, the event ingestor 12 writes a checkpoint to durable storage (e.g., a disk or other non-volatile storage). The checkpoint identifies a value of a variable corresponding to the chronology and the most recent event during which the value of that variable was valid. Armed with this checkpoint and an event list it is possible to reconstruct the complete chronology. The event list itself is assumed to be much less expensive to maintain in durable storage because events are not revised, and therefore each event only needs to be stored once.

Figure 10:
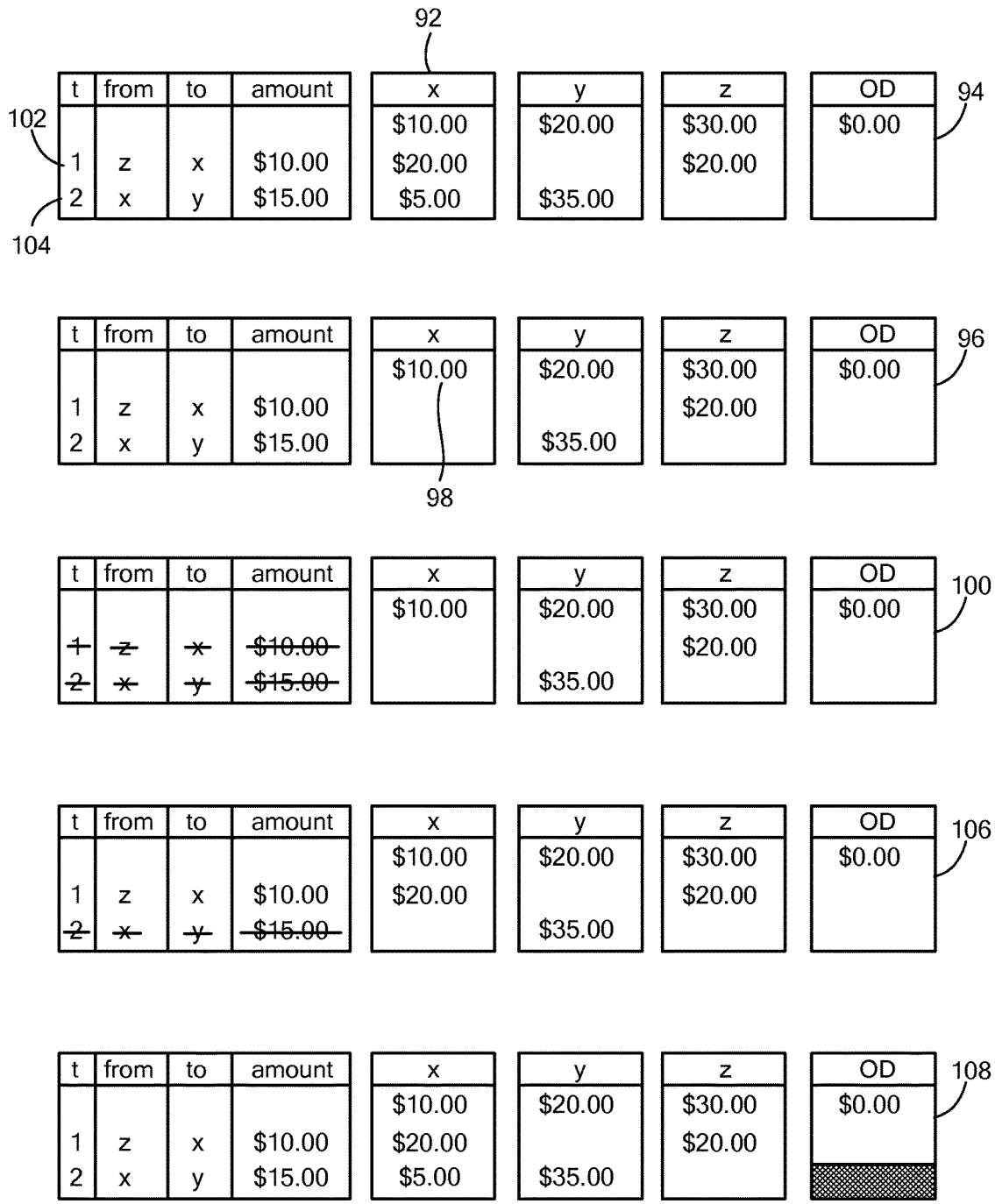
FIG. 10 shows reconstruction of a chronology.

FIG. 10 begins with a chronology 92 that is to be recovered (step 94). As a result of some failure, a portion of the chronology 92 has been lost (step 96). All that is left is a checkpoint value 98.

The first step in recovery is to identify those events that need to be processed. This results, in this case, in invalidation of first and second events 102, 104 (step 100).

As a result of invalidation, first and second event-handlers are spawned to reprocess the corresponding first and second events 102, 104. Thus results in reprocessing of the first event 102 (step 106) and reprocessing of the second event 104 (step 108).

The reconstruction method does not require reprocessing of all events, but only those events that are required to reconstruct the lost chronology 94.

EXAMPLE 7

Partial Chronology Reconstruction

In some cases, a chronology will have been damaged in a way that makes it difficult to determine if an event has been properly processed. In that case, one cannot tell if the event should be reprocessed or not. A conservative option is to reprocess all events, as described in the preceding example. However, this is computationally wasteful.

In an alternative embodiment, each frame further includes a generation count associated with each data access to the chronology that contains that frame. In this embodiment, every chronology access is accompanied by changing the generation count of the frame that was accessed. The combination of a particular frame's generation count and the surrogate timestamp of the event that led to accessing that frame defines a unique access tuple. When processing an event, an event processor begins by storing a starting and ending generation count. These can be used to later to determine whether the event must be reprocessed.

The process of using generation counts is illustrated in FIG. 11.

In the step 136 shown in FIG. 11, the event to be processed is the initializing of four chronologies. Processing this event required accessing each of the four chronologies. Each access is associated with a generation count. As shown in the figure, each chronology has a unique generator count, g, associated with that event. The initialization step began with a value of 1 for the generator count and ended with a value of 4 for the generation count.

In step 138, the event to be processed is the transfer of $15 from the X chronology to the Y chronology. Processing begins with the event frame having a starting generation count s=1. This is the first value of generation count that will be assigned during processing this event. The ending generation count, e, is left blank until the event is fully processed.

The next step in processing the event is to append a read-insert frame to the X chronology to reflect a deduction of $15 and a $10 overdraft fee (step 139). This requires a data access to the X chronology. To indicate this data access, the event processor marks the X chronology with a generation count g=1.

Event processing continues with step 140, in which a read-write frame is appended to the Y chronology. This requires access to the Y chronology. This access is the second access made during processing of the event. As a result, that read-write frame is tagged with a generation count of g=2.

Event processing requires access to one more chronology, the OD chronology. The next step, shown in step 144, is to append a read-write frame to the OD chronology. Since this would be the third chronology access made in the course of processing the particular event, this appended read-write frame is tagged with a generation count of g=3.

At this point, processing the event is complete, and all that remains is to update the ending generation count, e, for this event to "3."

This state of completion does not last long, however. In step 146, a delayed event at t=1 arrives. This event includes instruction to transfer $10 from the Z account to the X account. Had this event arrived earlier, i.e. before the event at t=2, the overdraft would never have occurred. Now that it has arrived, the overdraft must be undone and everything else put to right.

As shown in step 146, the event at t=1 is shown at the end of event processing. Processing the event at t=1 required two accesses. This results in starting and ending generation counts of s=1 and e=2 respectively in the event frame for t=1. As a result of the late arrival of the event at t=1, the event at t=2 is now invalid. Its state is now marked "pending" to show that reprocessing of the event at t=2 has begun.

In anticipation of another access, the starting generator count for the event frame of the event at t=2 is now incremented to s=4. Its ending generation count, e, is deleted since it is will not be known until completion of event reprocessing.

In step 148, reprocessing of the event at t=2 is complete. The end generation counter for the event is filled in. And the chronologies have all converged to a state that is consistent with all known events.

FIG. 12 inventories all the chronology states that the chronologies in FIG. 11 passed through. Each column in FIG. 12 represents one node. FIG. 13 does the same for all the event frames. Each column in FIG. 13 corresponds to one event.

It is apparent from the examples in FIGS. 11 and 12 that there are several conditions that must be present for an event to be valid. First, the event frame should be marked valid. Second, the access field of the event frame should match the accesses in the chronologies. Third, the value frames are all marked valid. And last, the generation counts in the chronologies should match the range of generation counts specified in the event frame. If any one of these conditions is not met, the event cannot be valid.

It is assumed that there exists a decentralized logging system and that any changes to chronologies or to the event list are saved to logs such that after a failure, it is possible to recover chronologies and the event list to some earlier state. Because logging is decentralized, and because not all chronologies are stored in the same node, it is possible to have, after a node failure, any combination of states in FIG. 11. The idea is to determine which events, if any need to be reprocessed. Using generation counters as described below, it is possible to determine whether the combination of events is valid. This avoids the need to reprocess events unnecessarily.

Figure 14:
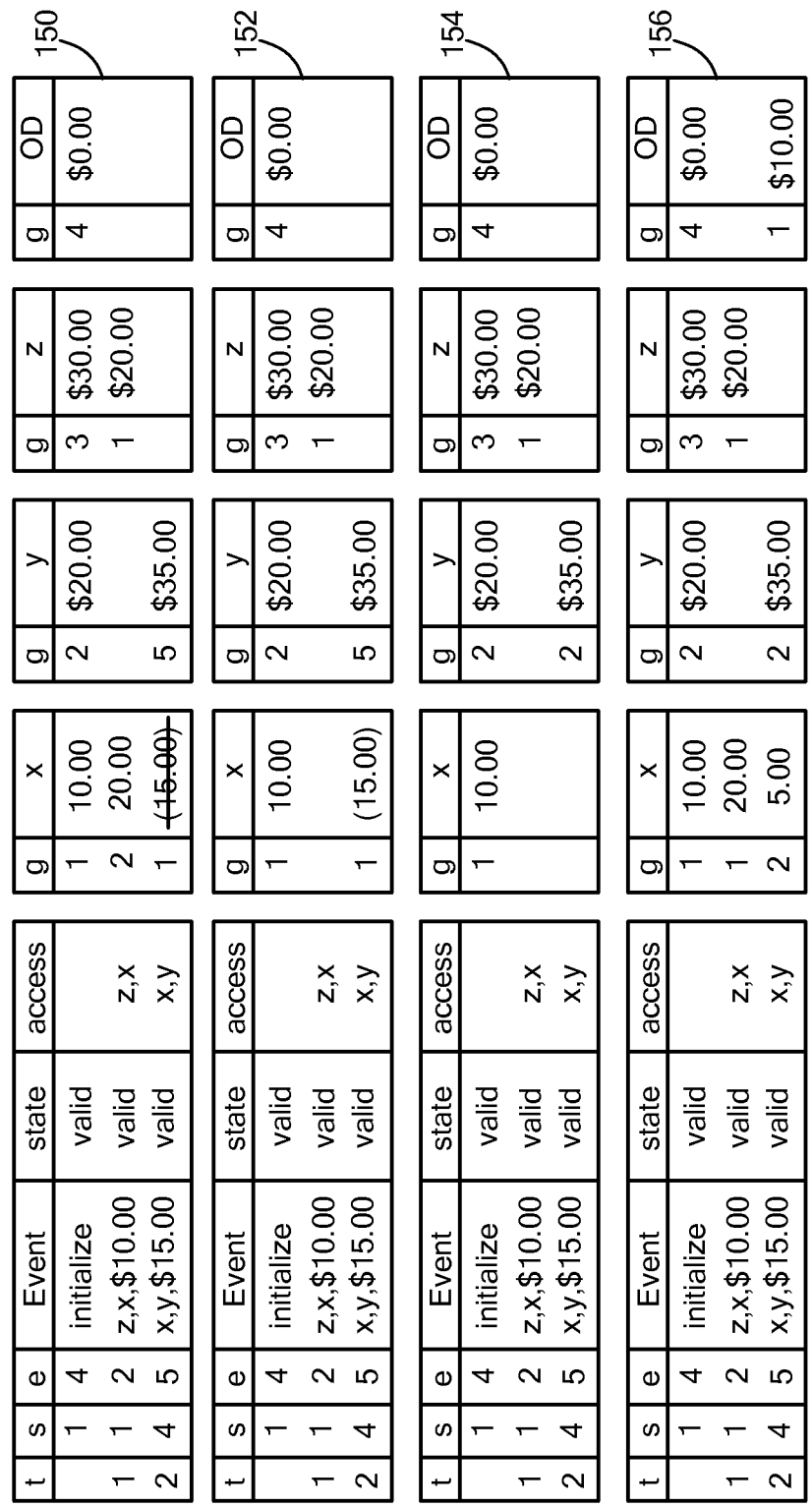
FIG. 14 shows examples of regression based on the states in FIGS. 12 and 13.

FIG. 14 shows examples of how to use the event frames, and the above four conditions, to determine whether the chronologies are correct.

In example 150, all event frames are marked as valid. But in fact, on closer inspection, particularly inspection of generation counters, it is apparent that the event at t=2 is invalid and requires reprocessing. In particular, the starting and ending generation counters of the event at t=2 define a closed interval [4, 5]. Thus, the chronologies should show generation counters in the interval [4, 5]. But they do not. The X chronology has a generator counter of 1, which is outside the interval.

In example 152, although all events are marked as valid, the event at t=1 must be invalid. This is because the event frame specifies that the chronologies for the event should have generation counts in the interval [1, 2]. In reality, the only generation count is g=1. The X chronology has apparently not yet been accessed. The event at t=2 is also invalid because the event list requires that all generation counts in the corresponding chronologies lie in the interval [4, 5]. However, the generation counts actually line in the interval [1, 5]. Thus, both events require reprocessing.

It is possible to arrive at the same result by inspecting the access field of the event frame. According to the access field of the event frame for t=1, there should have been an access to both the Z chronology and the X chronology. According to the chronologies themselves, only the Z chronology was accessed.

In example 154, both events at t=1 and t=2 are invalid. This is because the access field in the event frame for the event at t=1 shows that there should have been an access to both the X chronology and the Z chronology. As is apparent, nothing has accessed the X chronology. The same reasoning applies to the event at t=2.

In example 156, the event at t=1 is invalid because, according to the event frame at t=1, the generation counts should all be in the interval [1, 2]. However, in the corresponding chronologies, the generation counts are in the degenerate range [1, 1]. The event at t=2 is also invalid because the predicted generation count range in the event frame, [4, 5], does not match what is in the chronologies.

Figure 15:
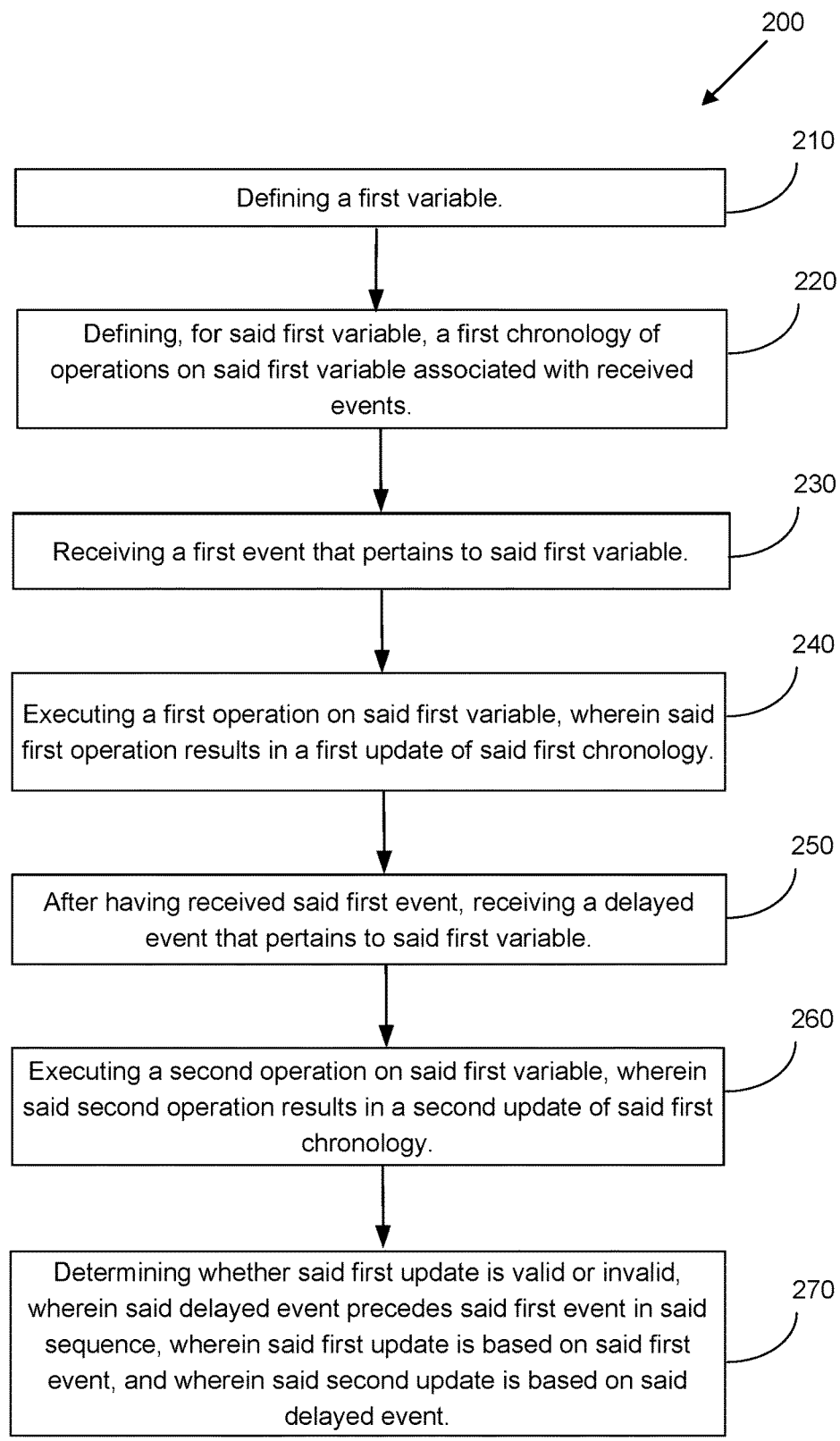
FIG. 15 is a flowchart of an example method for causing a computing system to process events.

FIG. 15 is a flowchart of an example method 200 for causing a computing system to process events from a sequence of events that defines a correct order for said events independent from an order in which those events are received over an input device or port. As shown, the method 200 includes defining 210 a first variable, defining 220, for the first variable, a first chronology of operations on the first variable that are associated with received events, receiving 230 a first event that pertains to the first variable, and executing 240 a first operation on said first variable, which results in a first update of the first chronology. The method 200 further includes, after having received the first event, receiving 250 a delayed event that pertains to the first variable, executing 260 a second operation on said first variable, which results in a second update of the first chronology, and determining 270 whether the first update is valid or invalid, wherein the delayed event precedes the first event in the sequence, wherein the first update is based on the first event, and wherein the second update is based on the delayed event.

The event-processing approach described above can be implemented, for example, using a programmable computing system executing suitable software instructions or it can be implemented in suitable hardware such as a field-programmable gate array (FPGA) or in some hybrid form. For example, in a programmed approach the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user interface (for receiving input using at least one input device or port, and for providing output using at least one output device or port). The software may include one or more modules of a larger program, for example, that provides services related to the design, configuration, and execution of dataflow graphs. The modules of the program (e.g., elements of a dataflow graph) can be implemented as data structures or other organized data conforming to a data model stored in a data repository.

The software may be stored in non-transitory form, such as being embodied in a volatile or non-volatile storage medium, or any other non-transitory medium, using a physical property of the medium (e.g., surface pits and lands, magnetic domains, or electrical charge) for a period of time (e.g., the time between refresh periods of a dynamic memory device such as a dynamic RAM). In preparation for loading the instructions, the software may be provided on a tangible, non-transitory medium, such as a CD-ROM or other computer-readable medium (e.g., readable by a general or special purpose computing system or device), or may be delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The inventive system may also be considered to be implemented as a tangible, non-transitory medium, configured with a computer program, where the medium so configured causes a computer to operate in a specific and predefined manner to perform one or more of the processing steps described herein.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

The invention claimed is:

1. A method for causing a computing system to process events from a sequence of events that defines a correct order for said events independent from an order in which those events are received over an input device or port, said method including:
   defining a first variable,
   defining, for said first variable, a first chronology of operations on said first variable associated with received events,
   receiving a first event that pertains to said first variable,
   executing a first operation on said first variable, wherein said first operation results in a first update of said first chronology,
   after having received said first event, receiving a delayed event that pertains to said first variable,
   executing a second operation on said first variable, wherein said second operation results in a second update of said first chronology, wherein said first update occurred earlier than said second update,
   determining whether to reprocess said previously executed first operation based on a determination, using said first chronology, of whether said earlier first update is valid or invalid, and
   reprocessing said previously executed first operation based on the determination that said earlier first update is invalid;
   wherein said delayed event precedes said first event in said sequence,
   wherein said first update is based on said first event, and wherein said second update is based on said delayed event.

2. The method of claim 1, wherein determining whether said first update is valid or invalid includes determining that said first update is valid.

3. The method of claim 2, wherein determining that said first update is valid includes determining that said first update is the insertion of a write operation before said first update.

4. The method of claim 2, wherein determining that said first update is valid includes determining that said delayed event resulted in insertion of a read operation before said first update.

5. The method of claim 2, wherein determining that said first update is valid includes determining that said delayed event required insertion of an update operation before said first update.

6. The method of claim 2, wherein determining that said first update is valid includes determining that said first update is not affected by said second update.

7. The method of claim 1, wherein determining whether said first update is valid or invalid includes determining that said first update is affected by said second update, and rescinding said first update in response to determining that said first update is invalid.

8. The method of claim 1, wherein determining whether said first update is valid or invalid includes determining that said first update is affected by said second update, causing said first update to be invalid.

9. The method of claim 8, wherein determining that said first update is affected by said second update includes determining that said delayed event required insertion of a chronology entry indicating an operation that includes writing said first variable before a chronology entry corresponding to said first update.

10. The method of claim 8, wherein determining that said first update is affected by said second update includes determining that said delayed event required updating an existing chronology entry indicating an operation on said first variable before a chronology entry corresponding to said first update.

11. The method of claim 1, wherein said correct order for said sequence of events is partially ordered, and said method further includes causing said sequence of events to be completely ordered.

12. The method of claim 1, wherein receiving said first event includes receiving said event from a set of completely ordered events.

13. The method of claim 1, further including
   detecting a loss of data in said first chronology,
   retrieving a first checkpoint value indicative of a valid value of said first variable in said first chronology,
   based on said checkpoint value, retrieving a subset of events from a list of events, said list of events including said first event,
   reprocessing said subset of events, thereby reconstructing said data lost in said loss of data, and
   revising said first chronology to include said data lost in said loss of data.

14. The method of claim 1,
   wherein said first chronology includes a plurality of entries corresponding to operations resulting from a plurality of events that are after an entry corresponding to a delayed event operation corresponding to said delayed event, wherein executing a second operation includes identifying a barrier operation that blocks propagation of invalidity in said plurality of entries, and revising only those operations from said plurality of operations whose entries are between entries corresponding to said delayed event operation and said barrier operation.

15. The method of claim 14, wherein identifying a barrier operation includes identifying a write operation as a barrier operation.

16. The method of claim 1, wherein determining whether said first update is valid includes identifying an access to said first chronology that must have occurred to correctly execute said first update, inspecting said first chronology, and based on said inspection, determining whether said access has occurred.

17. The method of claim 16, further including maintaining first information and second information, wherein said first information identifies an access to said first chronology, and wherein said second information identifies a range of accesses required to process said first event, and determining that said first information is within said range of accesses.

18. The method of claim 1, wherein the computing system includes a plurality of nodes in communication over a network, and said method further includes causing said computing system to execute the steps of storing said first variable and said first chronology at a first node;

storing a second variable and a second chronology of operations on said second variable at a second node; and processing at least some events of said sequence of events by performing operations on both said first and second variables, and updating both of said first and second chronologies in response to processing said events.

19. The method of claim 1, wherein determining whether to reprocess said first operation includes: determining whether said delayed event can affect a value of said first variable resulting from said first operation.

20. The method of claim 1, wherein determining whether to reprocess said first operation includes: determining, based on a type of said second operation, whether said second operation is a significant operation that can cause modification of a later value of said first variable, or an insignificant operation that cannot cause modification of a later value of said first variable.

21. Software, stored in non-transitory form on a computer-readable medium, for causing a computing system to process events from a sequence of events that defines a correct order for said events independent from an order in which those events are received over an input device or port, said software including instructions for causing a computing system to:

define a first variable, define, for said first variable, a first chronology of operations on said first variable associated with received events, receive a first event that pertains to said first variable, execute a first operation on said first variable, wherein said first operation results in a first update of said first chronology, receive, after having received said first event, a delayed event that pertains to said first variable, execute a second operation on said first variable, wherein said second operation results in a second update of said first chronology, wherein said first update occurred earlier than said second update, determine whether to reprocess said previously executed first operation based on a determination, using said first chronology, of whether said earlier first update is valid or invalid, and reprocess said previously executed first operation based on the determination that said earlier first update is invalid;

wherein said delayed event precedes said first event in said sequence, wherein said first update is based on said first event, and wherein said second update is based on said delayed event.

22. The software of claim 21, wherein determining whether said first update is valid or invalid includes determining that said first update is valid.

23. The software of claim 22, wherein determining that said first update is valid includes determining that said first update is not affected by said second update.

24. The software of claim 21, wherein determining whether said first update is valid or invalid includes determining that said first update is affected by said second update, and rescinding said first update in response to determining that said first update is invalid.

25. The software of claim 21, wherein determining whether said first update is valid or invalid includes determining that said first update is affected by said second update, causing said first update to be invalid.

26. The software of claim 25, wherein determining that said first update is affected by said second update includes determining that said delayed event required insertion of a chronology entry indicating an operation that includes writing said first variable before a chronology entry corresponding to said first update.

27. The software of claim 25, wherein determining that said first update is affected by said second update includes determining that said delayed event required updating an existing chronology entry indicating an operation on said first variable before a chronology entry corresponding to said first update.

28. The software of claim 21, wherein determining whether said first update is valid includes identifying an access to said first chronology that must have occurred to correctly execute said first update, inspecting said first chronology, and based on said inspection, determining whether said access has occurred.

29. The software of claim 21, wherein the computing system includes a plurality of nodes in communication over a network, and said software further includes instructions for causing said computing system to store said first variable and said first chronology at a first node;

store a second variable and a second chronology of operations on said second variable at a second node; and process at least some events of said sequence of events by performing operations on both said first and second variables, and updating both of said first and second chronologies in response to processing said events.

30. The software of claim 21, wherein determining whether to reprocess said first operation includes: determining whether said delayed event can affect a value of said first variable resulting from said first operation.

31. The software of claim 21, wherein determining whether to reprocess said first operation includes: determining, based on a type of said second operation, whether said second operation is a significant operation that can cause modification of a later value of said first variable, or an insignificant operation that cannot cause modification of a later value of said first variable.

32. A computing system for processing events from a sequence of events that defines a correct order for said events independent from an order in which those events are received over an input device or port, the computing system including:
an input device or port configured to receive said events; and
at least one processor configured to participate in processing of said sequence of events, said processing including
defining a first variable,
defining, for said first variable, a first chronology of operations on said first variable associated with received events,
receiving a first event that pertains to said first variable,
executing a first operation on said first variable, wherein said first operation results in a first update of said first chronology,
after having received said first event, receiving a delayed event that pertains to said first variable,
executing a second operation on said first variable, wherein said second operation results in a second update of said first chronology, wherein said first update occurred earlier than said second update,
determining whether to reprocess said previously executed first operation based on a determination, using said first chronology, of whether said earlier first update is valid or invalid, and
reprocessing said previously executed first operation based on the determination that said earlier first update is invalid;
wherein said delayed event precedes said first event in said sequence,
wherein said first update is based on said first event, and
wherein said second update is based on said delayed event.

33. The computing system of claim 32, wherein determining whether said first update is valid or invalid includes determining that said first update is valid.

34. The computing system of claim 33, wherein determining that said first update is valid includes determining that said first update is not affected by said second update.

35. The computing system of claim 32, wherein determining whether said first update is valid or invalid includes determining that said first update is affected by said second update, and rescinding said first update in response to determining that said first update is invalid.

36. The computing system of claim 32, wherein determining whether said first update is valid or invalid includes determining that said first update is affected by said second update, causing said first update to be invalid.

37. The computing system of claim 36, wherein determining that said first update is affected by said second update includes determining that said delayed event required insertion of a chronology entry indicating an operation that includes writing said first variable before a chronology entry corresponding to said first update.

38. The computing system of claim 36, wherein determining that said first update is affected by said second update includes determining that said delayed event required updating an existing chronology entry indicating an operation on said first variable before a chronology entry corresponding to said first update.

39. The computing system of claim 32, wherein determining whether said first update is valid includes
identifying an access to said first chronology that must have occurred to correctly execute said first update,
inspecting said first chronology, and
based on said inspection, determining whether said access has occurred.

40. The computing system of claim 32, wherein the computing system includes a plurality of nodes in communication over a network, and said processing further includes causing said computing system to execute the steps of
storing said first variable and said first chronology at a first node;
storing a second variable and a second chronology of operations on said second variable at a second node; and
processing at least some events of said sequence of events by performing operations on both said first and second variables, and updating both of said first and second chronologies in response to processing said events.

41. The computing system of claim 32, wherein determining whether to reprocess said first operation includes:
determining whether said delayed event can affect a value of said first variable resulting from said first operation.

42. The computing system of claim 32, wherein determining whether to reprocess said first operation includes:
determining, based on a type of said second operation, whether said second operation is a significant operation that can cause modification of a later value of said first variable, or an insignificant operation that cannot cause modification of a later value of said first variable.

43. A computing system for processing events from a sequence of events that defines a correct order for said events independent from an order in which those events are received over an input device or port, the computing system including:
means for receiving said events; and
means for processing said events, the processing including
defining a first variable,
defining, for said first variable, a first chronology of operations on said first variable associated with received events,
receiving a first event that pertains to said first variable,
executing a first operation on said first variable, said first operation resulting in a first update of said first chronology,
receiving a delayed event that pertains to said first variable after having received said first event,
executing a second operation on said first variable, said second operation resulting in a second update of said first chronology, wherein said first update occurred earlier than said second update,
determining whether to reprocess said previously executed first operation based on a determination, using said first chronology, of whether said earlier first update is valid or invalid, and
reprocessing said previously executed first operation based on the determination that said earlier first update is invalid;
wherein said delayed event precedes said first event in said sequence, wherein said first update is based on said first event, and wherein said second update is based on said delayed event.

\* \* \* \* \*